(12) United States Patent
D'Amato et al.

(10) Patent No.: US 9,158,961 B2
(45) Date of Patent: Oct. 13, 2015

(54) METHOD FOR GENERATING, TRANSMITTING AND RECEIVING STEREOSCOPIC IMAGES, AND RELATED DEVICES

(75) Inventors: Paolo D'Amato, Roma (IT); Giovanni Ballocca, Turin (IT)

(73) Assignee: S.I.SV.EL SOCIETA ITALIANA PER LO SVILUPPO DELL'ELETTRONICA S.P.A., None (IT)

( * ) Notice: Subject to any disclaimer, the term of this patent is extended or adjusted under 35 U.S.C. 154(b) by 178 days.

(21) Appl. No.: 13/984,983

(22) PCT Filed: Feb. 13, 2012

(86) PCT No.: PCT/IB2012/050634
§ 371 (c)(1),
(2), (4) Date: Aug. 14, 2013

(87) PCT Pub. No.: WO2012/110935
PCT Pub. Date: Aug. 23, 2012

(65) Prior Publication Data
US 2013/0315474 A1    Nov. 28, 2013

(30) Foreign Application Priority Data
Feb. 14, 2011  (IT) .............................. TO2011A0124

(51) Int. Cl.
*G06K 9/00* (2006.01)
*H04N 13/00* (2006.01)
(Continued)

(52) U.S. Cl.
CPC ........ *G06K 9/00201* (2013.01); *H04N 13/0048* (2013.01); *H04N 19/119* (2014.11); *H04N 19/597* (2014.11); *H04N 19/86* (2014.11); *H04N 19/88* (2014.11)

(58) Field of Classification Search
CPC combination set(s) only.
See application file for complete search history.

(56) References Cited

U.S. PATENT DOCUMENTS 6,188,518 B1 * 2/2001 Martin .......................... 359/464
6,252,707 B1 * 6/2001 Kleinberger et al. ......... 359/465
(Continued)

FOREIGN PATENT DOCUMENTS

WO    2008/153863    12/2008

OTHER PUBLICATIONS

International Search Report dated Apr. 25, 2012, issued in PCT Application No. PCT/IB2012/050634 filed Feb. 13, 2012.
(Continued)

*Primary Examiner* — Anand Bhatnagar
(74) *Attorney, Agent, or Firm* — Workman Nydegger

(57) ABSTRACT

A method for generating a composite image of a stereoscopic video stream includes a pair of a right image and a left image of a scene, the right image and the left image being such that, when viewed by a spectator's right eye and left eye, respectively, they cause the spectator to perceive the scene as being three-dimensional, the method includes the steps of: generating a composite image including all the pixels of the pair of right and left images, defining a grid of macroblocks of the composite image, each macroblock of the grid including a plurality of adjacent pixels, decomposing one image of the pair of right and left images into a plurality of component regions including a plurality of contiguous pixels, processing the component regions in a manner such as to generate corresponding derived regions, the derived regions including at least all the pixels of a corresponding component region and being such that they can be decomposed into an integer number of macroblocks, arranging the non-decomposed image of the pair and the plurality of derived regions in the composite image in a manner such that all the edges of the non-decomposed image and of the derived regions coincide with edges of macroblocks of the grid.

28 Claims, 15 Drawing Sheets

(51) Int. Cl.
  *H04N 19/597* (2014.01)
  *H04N 19/119* (2014.01)
  *H04N 19/86* (2014.01)
  *H04N 19/88* (2014.01)

(56) References Cited

U.S. PATENT DOCUMENTS

| | | | |
|---|---|---|---|
| 6,606,078 B2 * | 8/2003 | Son et al. | 345/6 |
| 6,819,489 B2 * | 11/2004 | Harris | 359/464 |
| 6,864,862 B2 * | 3/2005 | Sato et al. | 345/32 |
| 7,190,518 B1 * | 3/2007 | Kleinberger et al. | 359/465 |
| 8,514,219 B2 * | 8/2013 | Saito | 345/419 |
| 8,896,919 B2 * | 11/2014 | Song et al. | 359/463 |
| 2002/0008674 A1 * | 1/2002 | Son et al. | 345/4 |
| 2004/0165265 A1 * | 8/2004 | Harris | 359/464 |
| 2005/0041736 A1 * | 2/2005 | Butler-Smith et al. | 375/240.01 |
| 2006/0015919 A1 * | 1/2006 | Karppinen et al. | 725/116 |
| 2007/0002372 A1 | 1/2007 | Sekizawa | |
| 2008/0303895 A1 | 12/2008 | Akka et al. | |
| 2013/0057644 A1 * | 3/2013 | Stefanoski et al. | 348/42 |

OTHER PUBLICATIONS

International Preliminary Report and Written Opinion dated Aug. 21, 2013, issued in PCT Application No. PCT/IB2012/050634 filed Feb. 13, 2012.

* cited by examiner

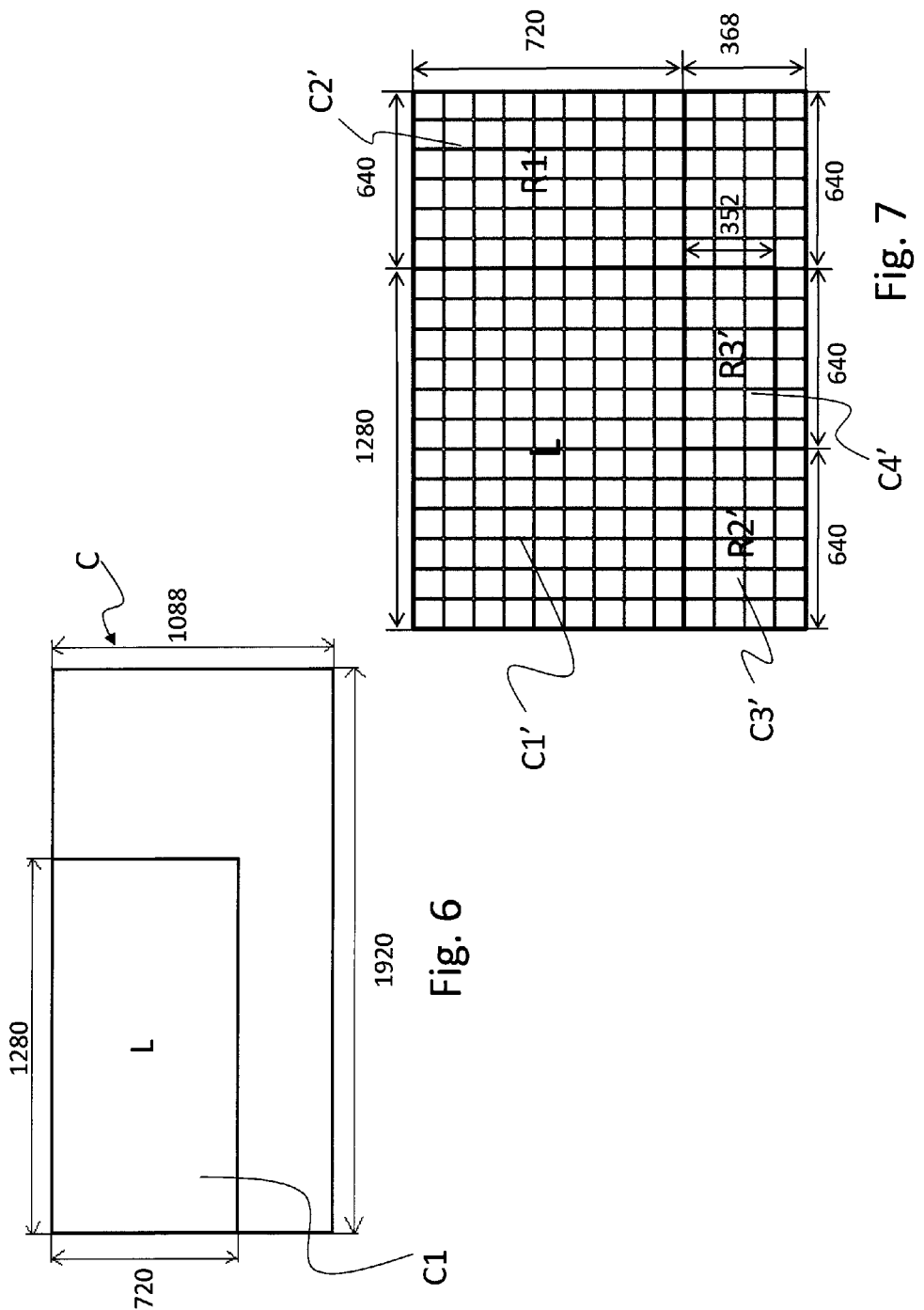

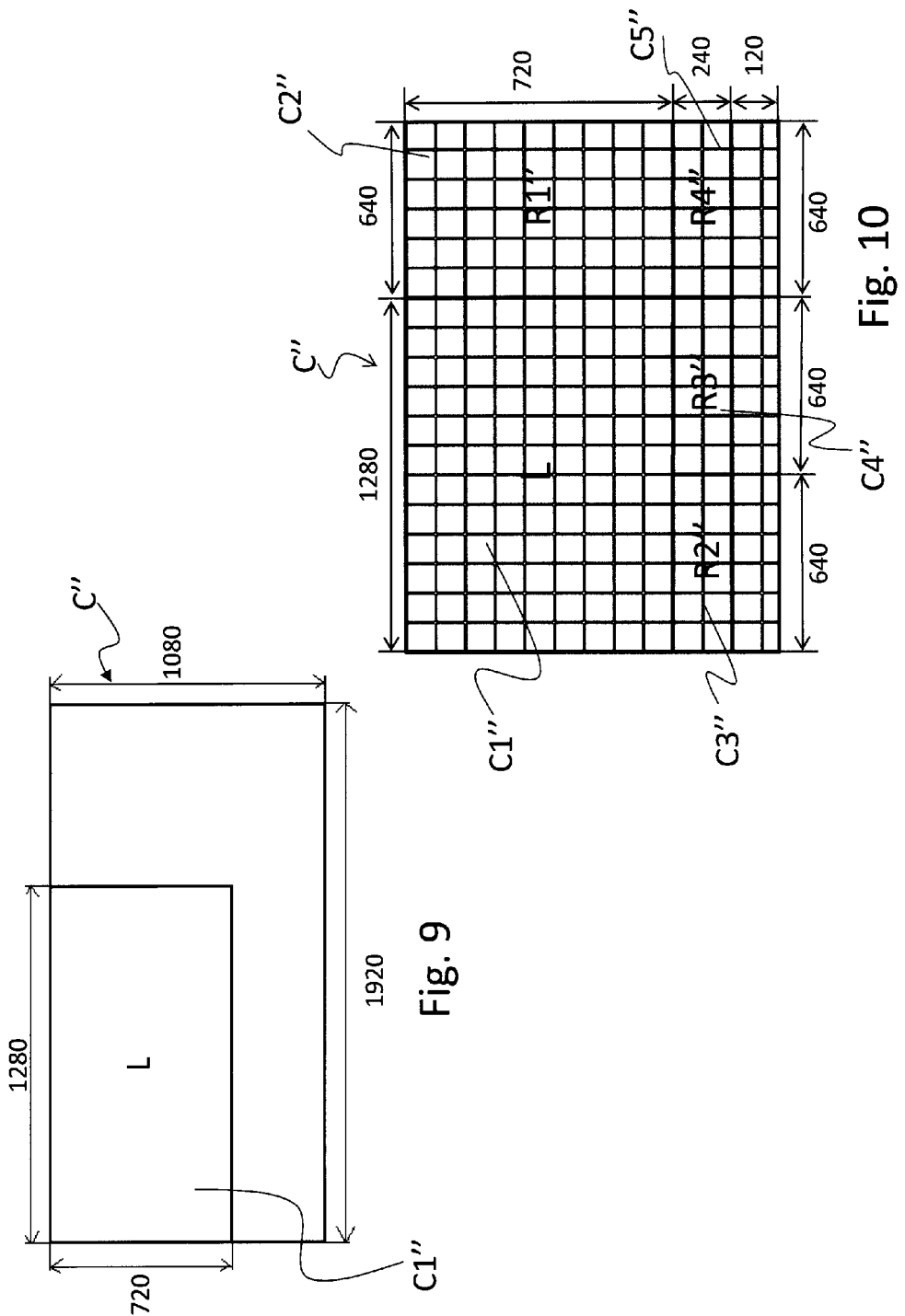

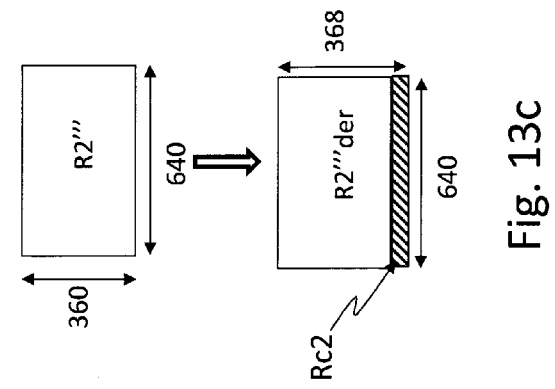
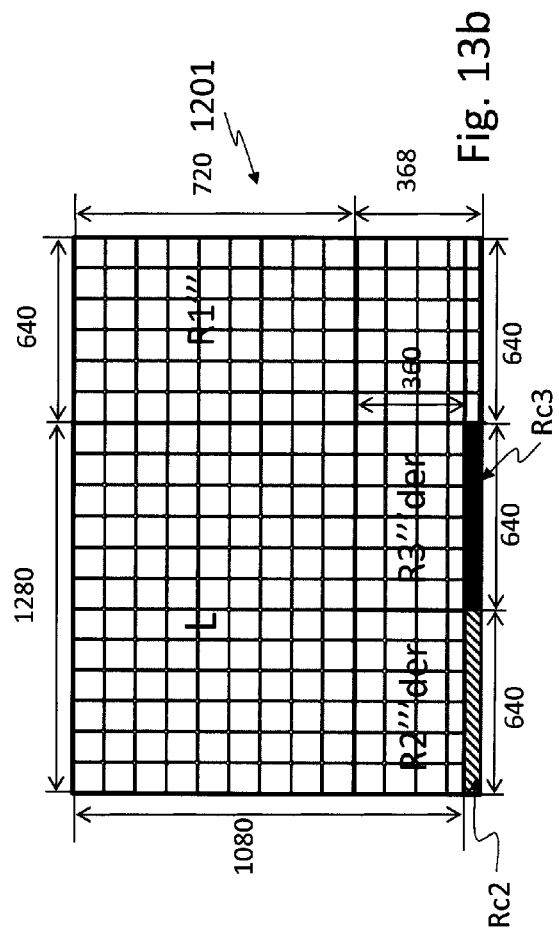

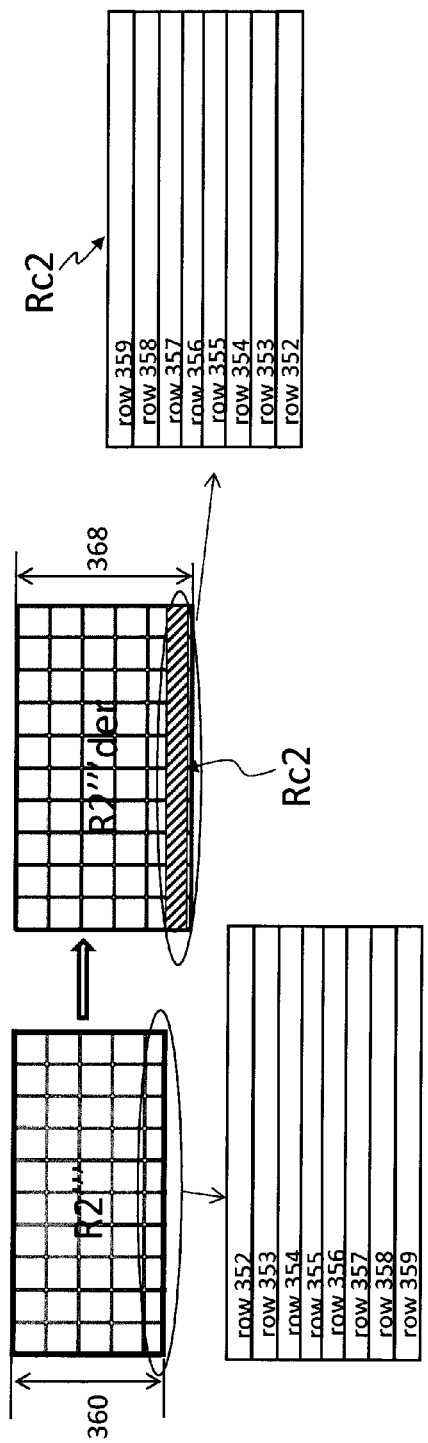
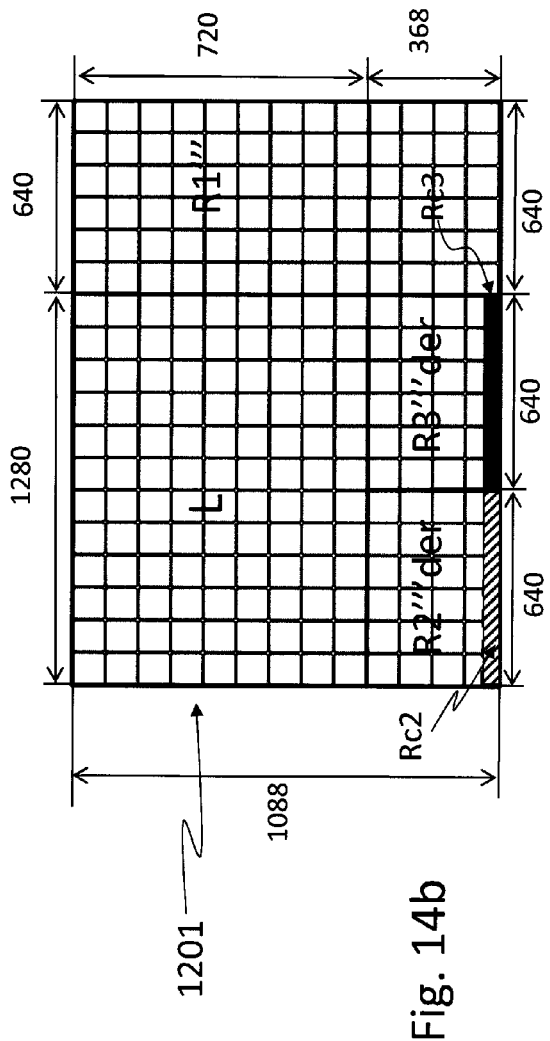
Fig. 14a
Fig. 14b

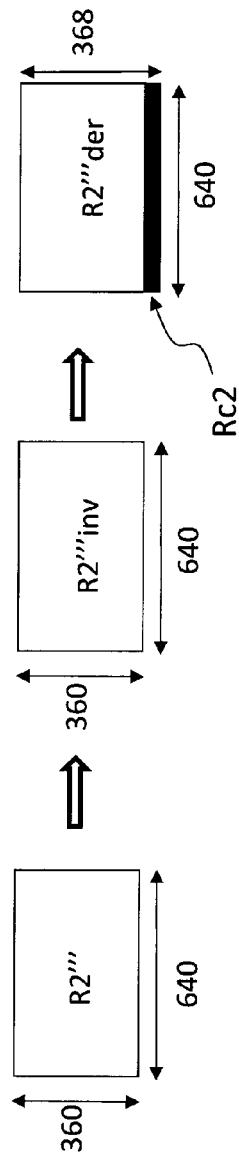
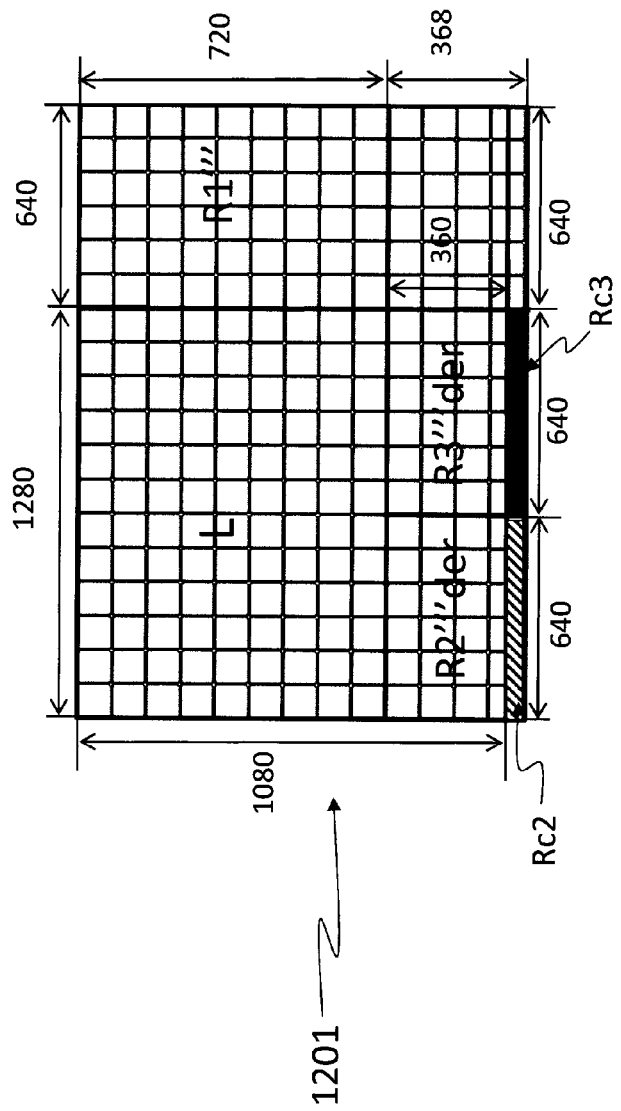

METHOD FOR GENERATING, TRANSMITTING AND RECEIVING STEREOSCOPIC IMAGES, AND RELATED DEVICES

FIELD OF THE INVENTION

The present invention relates to the multimedia field, in particular to a method and a related device for generating, transmitting and receiving stereoscopic video streams, i.e. video streams which, when appropriately processed in a display device, produce sequences of images that are perceived by a spectator as being three-dimensional.

More in particular, the invention relates to a method for generating stereoscopic video streams according to the preamble of claim 1.

PRIOR ART

As known, the perception of three-dimensionality can be obtained by reproducing two images, one for the viewer's right eye and the other for the viewer's left eye.

A stereoscopic video stream therefore transports information about two sequences of images, corresponding to the right and left perspectives of an object or scene, hereafter referred to as right image and left image, respectively.

In order to limit the band occupied by a stereoscopic video stream, it is known to multiplex the right and left images into a composite image that constitutes a frame of the stereoscopic video stream.

Multiplexing methods are also known which divide the right and left images into smaller regions, which are then entered into the composite image.

For example, patent application WO2008/153863 discloses a method that performs a 70% scaling of the right and left images; the scaled images are then divided into blocks of 8×8 pixels.

The blocks of each scaled image can be compacted into an area equal to approximately half the composite image.

Another method described in patent application WO2008/153863 applies diagonal scaling to each right and left image, so that the original image is deformed into a parallelogram. The two parallelograms are then broken up into triangular regions, and a rectangular composite image is composed wherein the triangular regions obtained by breaking up the two parallelograms are reorganized and rearranged. The triangular regions of the right and left images are organized in a manner such that they are separated by a diagonal of the composite image.

After the multiplexing step, the stereoscopic video stream is compressed according to compression algorithms which are well known to the man skilled in the art, such as, for example, those employed by the MPEG-2 or H.264 standards.

Such compression algorithms divide the composite image into blocks of pixels having predefined dimensions, hereafter referred to as macroblocks.

The macroblocks undergo a series of processing steps aimed at reducing the bit rate of the video stream, such as, for example, discrete cosine transform (DCT) for exploiting spatial correlation, coding of differences between adjacent frames and motion compensation for exploiting time correlation, variable length codes (VLC) for reducing statistic redundancy, DCT coefficient quantization for eliminating the least important information.

In the case of the H.264 standard, the blocks are squared and have a size of 16×16 pixels; other standards use differently sized macroblocks, e.g. 8×8 pixels for the MPEG-2 and JPEG standards.

Several experimental analyses carried out by the present Applicant have shown that those compression algorithms which utilize the division into macroblocks, when applied to composite images generated with the methods of patent application WO2008/153863, may produce compressed images with visible artifacts, in particular in those points where the composite image shows much discontinuity.

This problem is felt even more as the regions into which the right and left images are decomposed become smaller; this condition, in fact, implies the generation of considerable discontinuities along the region edges.

Consequently, the multiplexing method of patent application WO2008/153863 may produce evident compression artifacts.

OBJECTS AND SUMMARY OF THE INVENTION

The object of the present invention is therefore to provide a method for generating a stereoscopic video stream which can solve some of the problems suffered by the prior art. In particular, it is one object of the present invention to provide a method for generating a stereoscopic video stream which is particularly suitable for a subsequent compression, i.e. such that it produces a reduced number of compression artifacts.

It is a further object of the present invention to provide a method for generating a stereoscopic video stream which does not require huge computational resources.

These and other objects of the present invention are achieved through a method and a system for generating a stereoscopic video stream incorporating the features set out in the appended claims, which are intended as an integral part of the present description.

The general idea at the basis of the present invention consists of a method for generating a composite image comprising a pair of right and left images of a stereoscopic video stream.

The method provides for defining a grid of macroblocks of the composite image, wherein each macroblock of the grid comprises a plurality of adjacent pixels. One image of the pair of right and left images is decomposed into a plurality of regions, called component regions, which comprise a plurality of contiguous pixels. These component regions are then processed in a manner such as to generate other corresponding regions, called derived regions, which comprise at least all the pixels of a corresponding component region and which can be decomposed into an integer number of macroblocks. Subsequently, the non-decomposed image and the derived regions are entered into the composite image in a manner such that all the edges thereof coincide with edges of macroblocks of the previously defined grid.

The method generates a stereoscopic video stream which is not much subject to compression artifacts and which requires a low computational cost.

According to one aspect of the invention, the right and left images are entered into the container frame without performing any scaling operations, i.e. by placing into the container frame all the pixels of the images to be displayed.

Advantageously, one of the right image and the left image is decomposed into the lowest possible number of regions by taking into account the space available in the composite image and the space occupied by the other image left unchanged.

This requires limited computational resources, resulting in an advantage in terms of costs of the devices implementing the method of the present invention.

Advantageously, the macroblocks have a size of 16×16 pixels. This solution is particularly suited to the use of the compression algorithm mostly employed at present for High Definition television (H.264 standard).

The invention also relates to a system which allows implementing said method for generating a composite image.

In particular, according to the invention such a system may comprise:

- a decomposer module for decomposing one image of said pair of right and left images into
- a plurality of component regions comprising a plurality of contiguous pixels,
- a processing module for processing said component regions in a manner such as to generate corresponding derived regions,
- a composite image generator module, wherein said generator module is adapted to define a grid of macroblocks of the composite image and to arrange the non-decomposed image of said pair and said plurality of derived regions in a composite image in a manner such that all the edges of the non-decomposed image and of the derived regions coincide with edges of macroblocks of said grid.

According to a further aspect, the invention also relates to a method and a system for rebuilding a pair of images starting from a composite image (in particular a composite image generated according to a method and/or through a system of the above-described type, based on the definition of a macroblock grid).

In one embodiment, said method for rebuilding a pair of images provides for generating a first image of the pair by copying a single group of contiguous macroblocks of the composite image. Conversely, the other image is generated by a process wherein a plurality of derived regions of the composite image are extracted, each derived region having edges corresponding to edges of macroblocks of said grid. The derived regions are processed (copied and/or transformed, e.g. by means of rotations) so as to generate corresponding component regions, wherein all the pixels of a component region correspond to pixels of a derived region. The image is then generated by joining together the component regions.

According to another aspect, the invention relates to a system for rebuilding a pair of a right and left images starting from a composite image which has undergone a compression and decompression process based on the definition of a macroblock grid. The system comprises:

- a first extractor module for generating a first image of said pair of right and left images by copying a single group of contiguous pixels from a region of said composite image;
- a second extractor module adapted to extract a plurality of derived regions from the decompressed composite image, wherein each derived region has edges corresponding to edges of macroblocks of the grid and comprises a plurality of pixels not included in said single group of pixels;
- a processing module operationally connected to said extractor module for processing said derived regions in a manner such as to generate corresponding component regions;
- a second reassembler module operationally connected to said processing module and adapted to join together said component regions in order to generate an image of said pair of right and left images.

Further objects and advantages of the present invention will become more apparent from the following detailed description.

BRIEF DESCRIPTION OF THE DRAWINGS

Some preferred and advantageous embodiments of the present invention will now be described by way of non-limiting example with reference to the annexed drawings, wherein:

FIG. 6 shows a first step of constructing a composite image of the type shown in FIG. 2 according to a first embodiment of the present invention.

FIG. 7 shows the complete composite image of FIG. 6.

FIG. 9 shows a first step of constructing a composite image of the type shown in FIG. 3 according to a second embodiment of the present invention.

FIG. 10 shows the complete composite image of FIG. 9.

FIGS. 13a, 13b and 13c show a further embodiment of different elements and steps for generating a composite image.

FIGS. 14a and 14b show a further embodiment of a composite image.

FIGS. 15a and 15b show yet another embodiment of a composite image.

Figure 1:
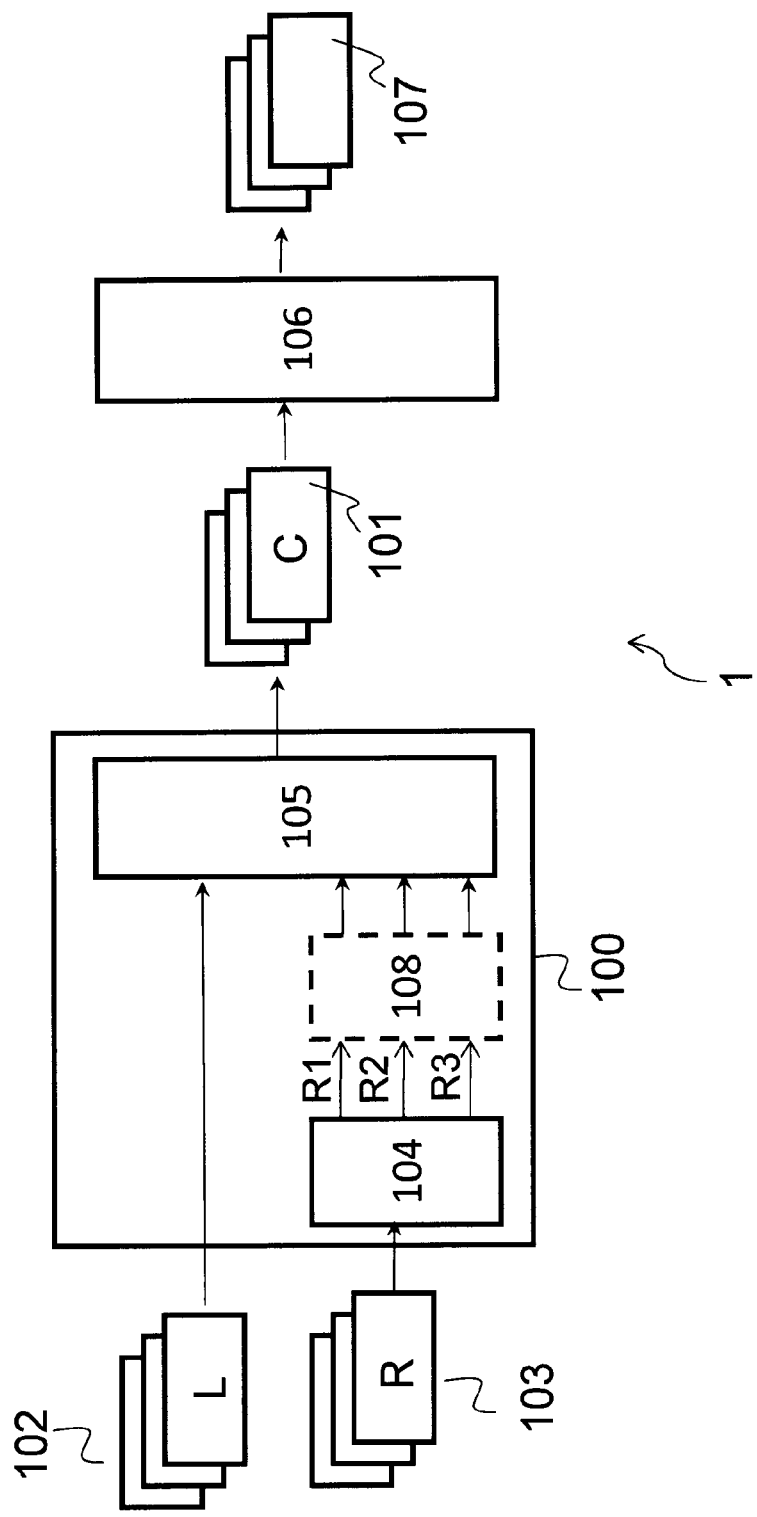
FIG. 1 is a block diagram of a system for generating a stereoscopic video stream.

In the figures showing frames containing macroblocks, for clarity and readability reasons the number of drawn macroblocks is lower than the actual one.

The above-mentioned drawings show different aspects and embodiments of the present invention and, where appropriate, similar structures, components, materials and/or elements in the various drawings are designated by the same or similar reference numerals.

DETAILED DESCRIPTION OF THE INVENTION

FIG. 1 shows the block diagram of a system 1 for generating a compressed stereoscopic video stream 107, comprising a packer device 100 connected to a compression module 106. In an alternative embodiment, the compression module 106 and the packer device 100 may be contained in the same apparatus.

The packer device 100 receives two sequences of images 102 and 103, e.g. two video streams, intended for the left eye (L) and for the right eye (R), respectively.

The packer 100 allows to implement a method for generating a stereoscopic video stream that comprises multiplexing two images of the two sequences 102 and 103.

In order to carry out the method of multiplexing the right and left images, the packer 100 comprises a decomposer module 104 for decomposing an input image (the right image R in the example of FIG. 1) into a plurality of sub-images, each corresponding to one region of the input image. In the embodiment of FIG. 1, the right image R is decomposed into three sub-images (R1, R2, R3), i.e. into the lowest possible number of rectangular sub-images. The assembler module 105 receives the non-decomposed image and the sub-images R1, R2 and R3 outputted by the decomposer module 104 and possibly processed by the module 108, as will be explained later on.

The assembler module 105 then builds a container frame by entering the image L and the received sub-images R1, R2 and R3 into a single composite image C, outputted by the packer 100.

The sequence of composite images C outputted by the packer 100 constitutes an uncompressed stereoscopic video stream 101.

The compression module 106 receives the stereoscopic video stream 101 and compresses it. The compression module 106 then generates a compressed stereoscopic video stream 107 with a lower bit rate than the uncompressed stereoscopic video stream 101.

The compression module receives the video stream 101 and processes it according to per se known compression algorithms, such as, for example, the compression algorithms used by the MPEG standards (MPEG 2, MPEG 4 AVC or H.264).

The algorithms used by the compression module 106 operate by decomposing the image to be compressed into a regular grid of macroblocks, i.e. contiguous blocks of pixels having predetermined dimensions, e.g. 16×16 or 8×8. Subsequently, the single macroblocks are processed according to known techniques, which will not be described herein.

Figure 2:
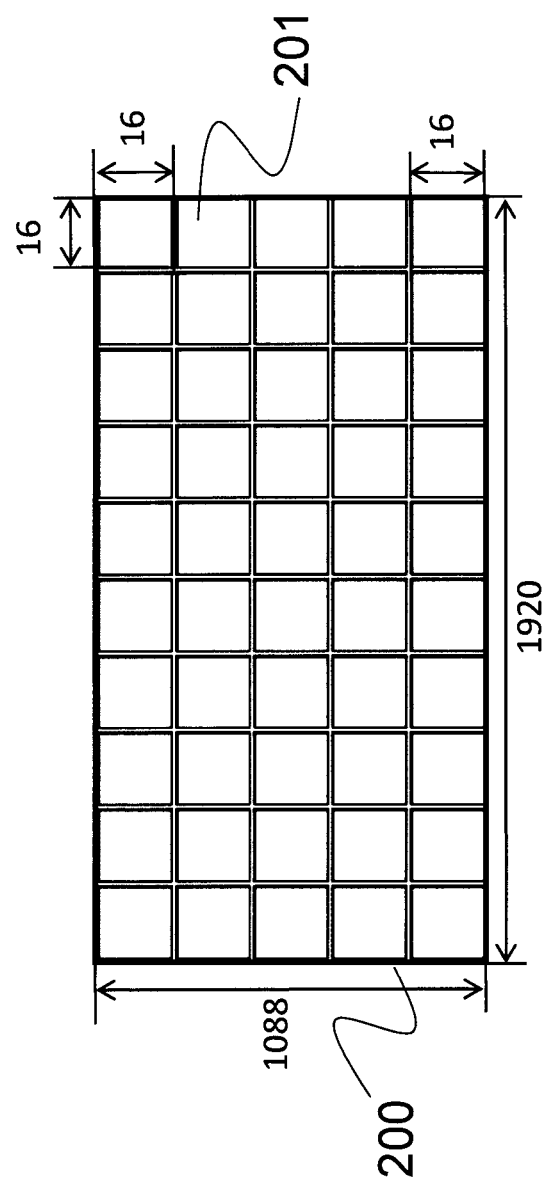
FIG. 2 shows a first typology of composite image.

FIG. 2 shows a first example of a composite image 200 of the video stream 101, wherein said composite image has a size of 1920×1088 pixels and can therefore be decomposed into an integer number of square macroblocks of 16×16 pixels. For clarity, the example of FIG. 2 shows a number of macroblocks 201 which is much smaller than the actual one. The same applies to all the other drawings that contain macroblocks.

The macroblocks 201 do not overlap each other and cover all the pixels of the composite image 200, thus forming a regular grid.

If the composite image C received by the compression module 106 has a size which is not suitable for being divided into an integer number of equally sized macroblocks, then the compression module 106 will add some pixels to the received composite image in order to be able to decompose it into an integer number of macroblocks having all the same dimensions. The added pixels may have arbitrary values of chrominance and luminance.

Figure 3:
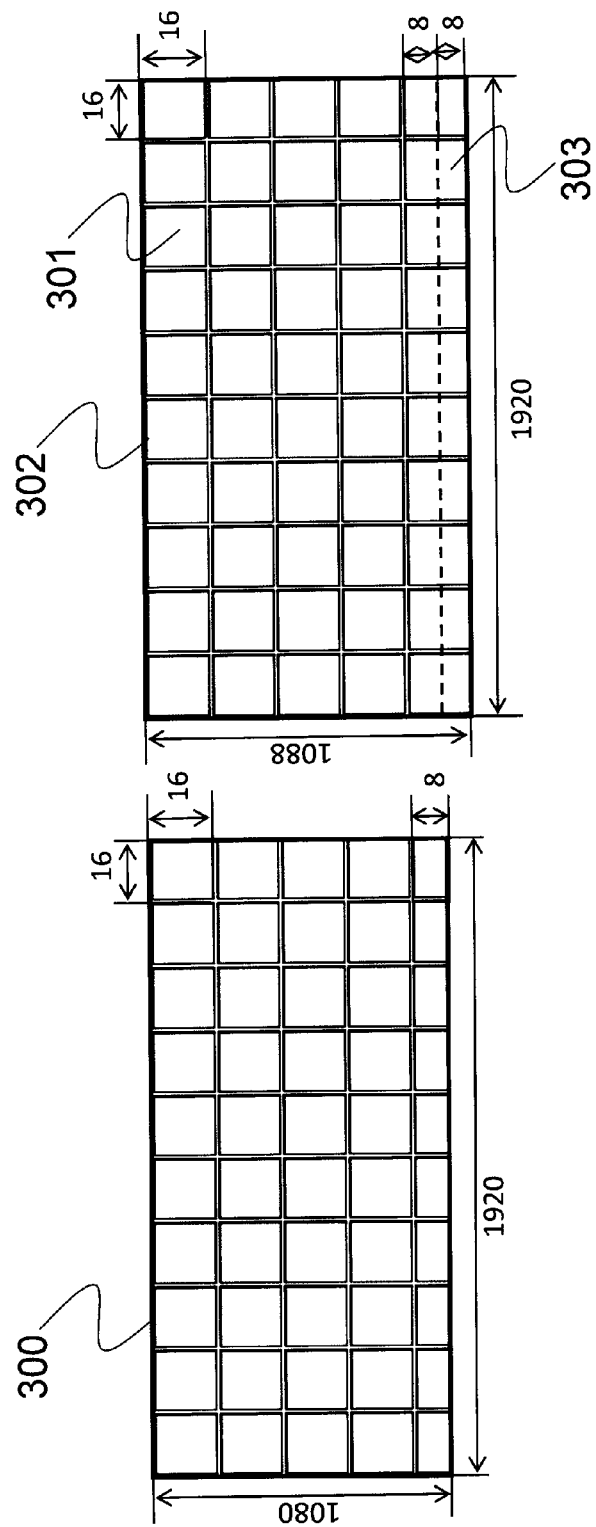
FIG. 3 shows a second typology of composite image.

For example, FIG. 3 shows a composite image 300 having a size of 1920×1080 pixels, i.e. a frame of a video stream of the 1080p type (progressive format with 1920×1080 pixels), wherein the macroblocks of the last row have a vertical dimension which is half that of all other macroblocks. When it receives the composite image 300, the compression module 106 finds that it cannot be completely divided into an integer number of non-overlapping macroblocks, in particular along the vertical dimension.

As a consequence, the compression module 106 adds eight rows (303) of 1920 pixels under the bottom edge of the composite image 300, so as to obtain a new composite image 302, called modified composite image, having a size of 1920×1088 pixels, which can be correctly divided into 8160 (eight thousand one hundred and sixty) macroblocks 301 with 16×16 size. In a practical example of implementation, all the pixels of the eight added rows 303 have such chrominance and luminance values that they are perceived as being green. Finally, the compression module 106 applies the compression algorithms to the modified composite image 302.

As a result of the above mode of operation, at the bottom of the image 302 there will be macroblocks showing much discontinuity (the transition between the last eight rows of the original image 300 and the eight added rows 303). This may cause, in the next compression step, artifacts revealing themselves in the composite image decompressed in the receiver, and therefore also in the images L and R rebuilt in the receiver itself (hereafter referred to as Lout and Rout). Such artifacts are nevertheless not much visible if they are at the edges of the images Lout and Rout; if however, due to the process of recomposition of the image divided into regions R, artifacts occur inside the reassembled image Rout, they may turn out to be very visible.

One example of a multiplexing method implemented by the packer 100 will now be described with reference to FIGS. 4 and 5.

The method starts at step 400; subsequently (step 401) the container frame C and the respective macroblock grid are defined.

In one embodiment, shown with reference to the example of FIG. 6, the left image L is entered into the container frame C and is positioned at the upper left corner. This is obtained by copying the 1280×720 pixels of the image L into an area C1 consisting of the first 1280 pixels of the first 720 rows of the container frame C.

When in the following description reference is made to entering an image into a frame, or to transferring or copying pixels from one frame to another, it is understood that this means to execute a procedure which generates (by using hardware and/or software means) a new frame comprising the same pixels as the source image.

The (software and/or hardware) techniques for reproducing a source image (or a group of pixels of a source image) into a target image are considered to be unimportant for the purposes of the present invention and will not be discussed herein any further, in that they are per se known to those skilled in the art.

Figure 5:
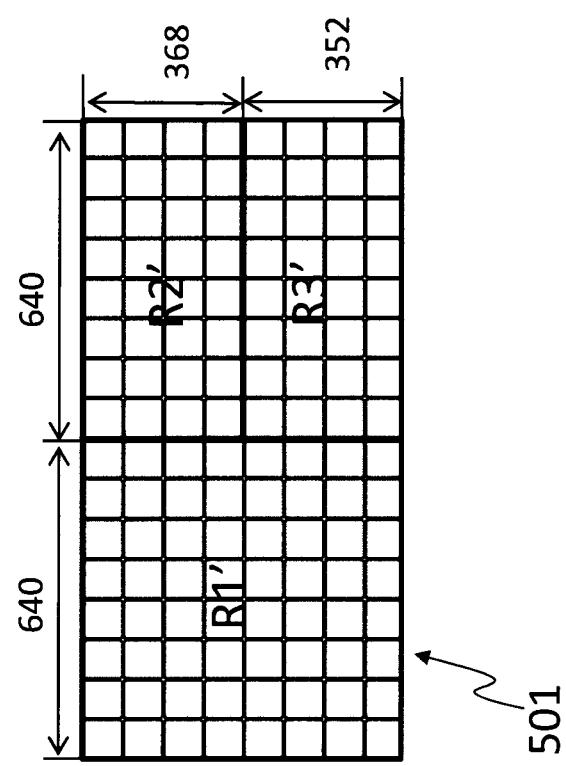
FIG. 5 shows a first form of decomposition of an image to be entered into a composite image.

The other image 501 of the two input images (right and left images) is decomposed (step 402) into a plurality of regions, as shown in FIG. 5. In the example of FIG. 5, the decomposed image 501 is a frame R of a 720p video stream, i.e. a progressive format with a resolution of 1280×720 pixels.

The image 501 comes from the video stream 103 that is transporting the images intended for the right eye, and is decomposed into three rectangular regions R1', R2' and R3', so that each of these regions contains an integer multiple of macroblocks, e.g. having a size of 16×16 pixels, not overlapping each other. R1', R2', R3' and C' respectively designate the regions R1, R2, R3 and the frame C which are obtained in the particular embodiment described below.

The decomposition of the image 501 is obtained by dividing it into two equally sized portions and by subsequently subdividing one of these two portions into two other portions.

The region R1' has a size of 640×720 pixels and is obtained by taking all the first 640 pixels of each row.

The region R2' has a size of 640×360 pixels and is obtained by taking the pixels from 641 to 1280 of the first 368 rows.

The region R3' has a size of 640×352 pixels and is obtained by taking the remaining pixels of the image R, i.e. the pixels from 641 to 1280 of the last 352 rows.

The decomposition step is carried out by the module 104, which outputs the sub-images R1', R2' and R3'.

Subsequently, the assembler module 105 builds the composite image C, which comprises the information pertaining to both the right and left input images; in the example described below, said composite image C is a frame of the output stereoscopic video stream, and therefore it is also referred to as container frame C'.

In this embodiment, the container frame C' is of the type previously described with reference to FIG. 2, i.e. an image of 1920×1088 pixels that can be completely decomposed by means of a regular grid into an integer number of 16×16 macroblocks.

More in general, the regions R1, R2 and R3, called component regions, can be processed (step 403) in a manner such as to generate corresponding derived regions that comprise at least all the pixels of the corresponding component region. This step is carried out by the module 108, which has been drawn with a dashed line in FIG. 1. In the embodiment previously described with reference to FIGS. 5 and 7, the processing of the regions R1', R2' and R3' does not take place. Consequently there is no step 403, in that the component regions (R1, R2, R3) and the derived regions (R1der, R2der, R3der) are identical. In addition, in this embodiment the processing module 108 of FIG. 1 only carries out the task of transferring to the assembler module 105 the component regions generated by the decomposer module 104.

In order to prevent the drawings and the text illustrating the various embodiments of the present invention from getting too crowded, the derived regions, when coinciding with the component regions, are simply designated as Ri, Ri', Ri'', Ri''' and Ri'''', instead of Rider, Ri'der, Ri''der, Ri'''der and Ri''''der, where the index can take values between 1 and 4. A reference with no apostrophes (R1, R2, R3, R4, C) will also be used whenever it indicates a generic component region and frame or composite image, regardless of the particular embodiment of the invention.

In alternative embodiments, the operations leading to the formation of one or more derived regions may be rotations, inversions, pixel additions, etc., and are carried out by the processing module 108 interposed between the decomposer module 104 and the assembler module 105.

Referring back to the example of FIG. 7, the container frame is assembled by first entering, unchanged, the non-decomposed left image into the container frame C' (step 404). In particular, the left image L is entered into the container frame in a manner such that all its edges coincide with the edges of the macroblocks of the container frame C'.

The region R1' is copied into the last 640 pixels of the first 720 rows (area C2'), i.e. next to the previously copied image L.

The regions R2' and R3' are copied under the area C1', i.e. respectively in the areas C3' and C4', which respectively comprise the first 640 pixels of the last 368 rows and the following 640 pixels of the rows from 721 to 1072.

It must be noted that, if the regions R2' and R3' were of the same size (i.e. both 640×360), the last row of macroblocks at the bottom would contain macroblocks with internal discontinuity, in that they would be composed of eight rows belonging to the regions R2' and R3' plus, at the bottom, eight added rows typically containing all equal pixels. By observing FIGS. 5 and 7 it can be understood that such a situation with equally sized regions R2 and R3 would make the pixels subject to artifacts, which would be positioned not only at the lower right edge of R (those of R3), but also at the centre of R (those belonging to the lower edge of R2').

The container frames C generated by the packer are then transferred to the compression module 106, which compresses them at step 405, thereby generating a compressed stereoscopic video stream 107. The method ends at step 406, with the transmission or storage of the compressed stereoscopic video stream.

As an alternative to the solution shown in FIG. 5, the regions R2' and R3' may be copied into the container frame C' in disjoined areas (i.e. neither overlapping nor neighbouring) separated by a group of pixels, without however limiting the effectiveness of the present invention.

The above-described multiplexing example cannot be used if the H.264 encoders are provided with an input HD-SDI (High Definition—Serial Digital Interface), capable of conveying a video stream in the 1080-row format, as opposed to the 1088-row format. Further possible multiplexing methods using the same inventive concept will therefore be described below, which are compatible with said interface.

Figure 8:
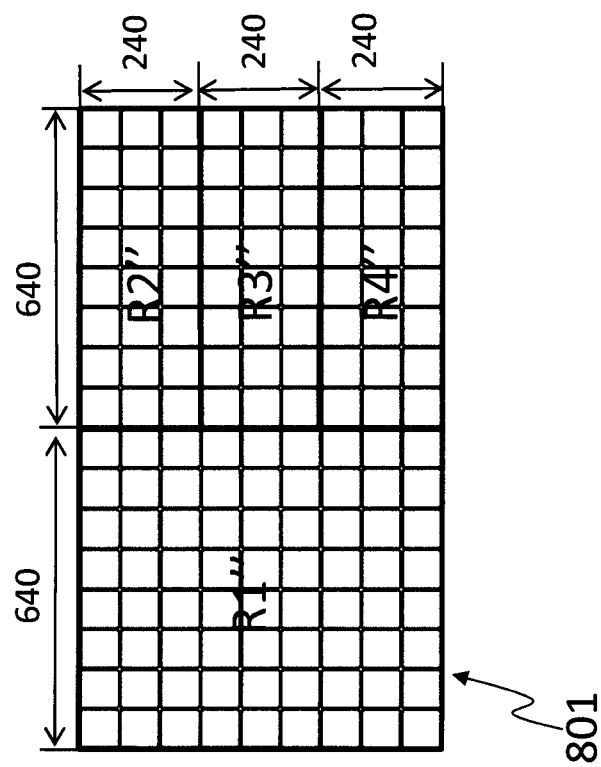
FIG. 8 shows a second form of decomposition of an image to be entered into a composite image.

In an embodiment alternative to that of FIG. 5, the right image can be decomposed into a number of rectangular regions which is not the lowest possible one. A solution of this kind is shown in FIG. 8, wherein the image 801 (coming from the video stream 103) is decomposed into four rectangular regions R1", R2", R3" and R4", so that each one of these regions contains an integer number of 16×16 macroblocks.

In one embodiment, the image 801 is decomposed by dividing it into two equally sized portions and then dividing again one of these two portions into three identical portions.

The region R1" has a size of 640×720 pixels and is obtained by taking all the first 640 pixels of each row.

The region R2" has a size of 640×240 pixels and is obtained by taking the pixels from 641 to 1280 of the first 240 rows.

The region R3" has a size of 640×240 pixels and is obtained by taking the pixels from 641 to 1280 of the rows from 241 to 480.

Finally, the region R4" has a size of 640×240 pixels and is obtained by taking the remaining pixels of the image 801, i.e. the pixels from 641 to 1280 of the rows from 481 to 720.

In the example described below with reference to FIGS. 9 and 10, the image 801 is entered into a container frame C" of the type previously described with reference to the image 300 of FIG. 3, i.e. an image not completely decomposable into an integer number of non-overlapping 16×16 macroblocks. In particular, the container frame C" has a size of 1920×1080 pixels.

Figure 4:
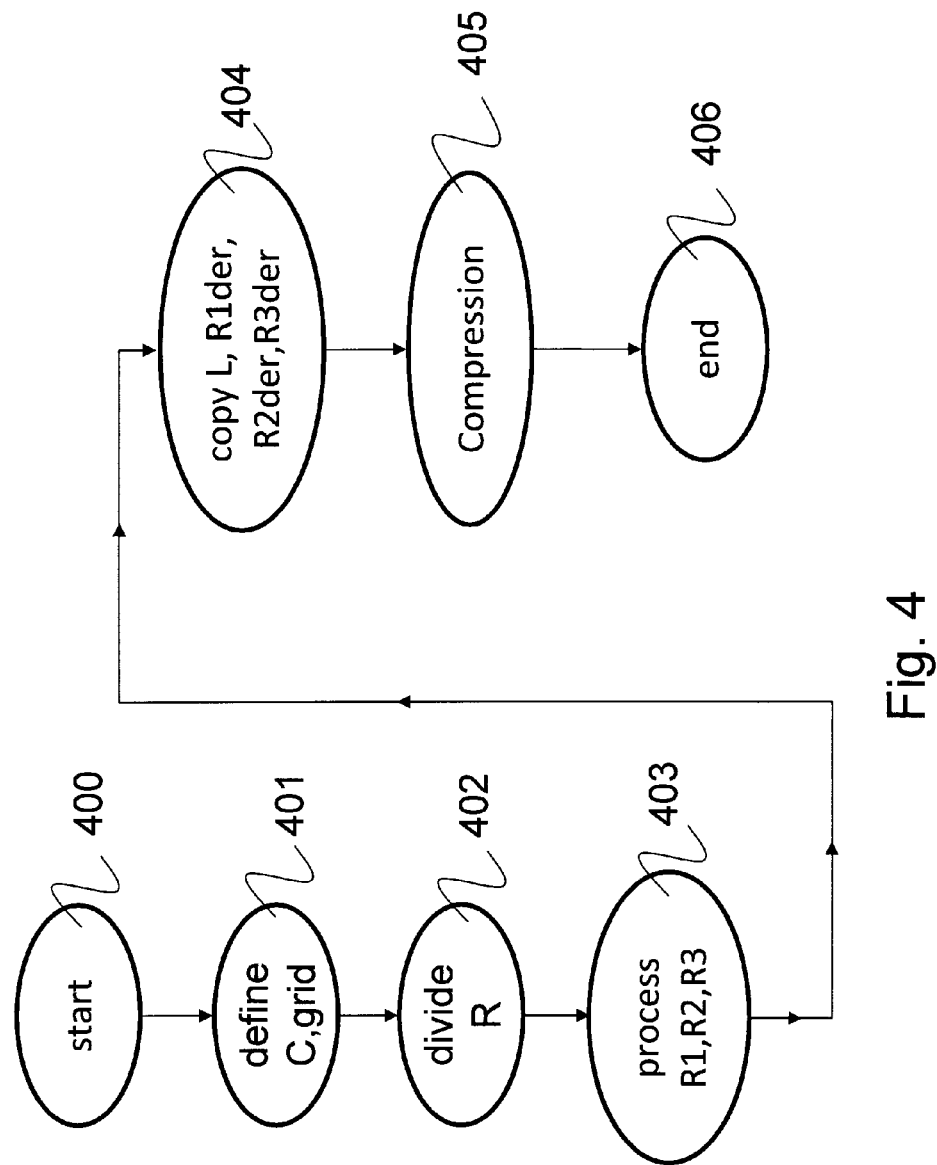
FIG. 4 is a flow chart of a method executed by the device of FIG. 1.

As in the example of FIG. 4, the multiplexing method provides for defining a grid of 16×16 macroblocks, into which the container frame C" is decomposed during the compression step.

The grid is defined by starting from the first pixel at the upper left corner. It follows that the container frame C" contains non-integer macroblocks at the bottom edge. In fact, this group of macroblocks has a vertical dimension which is half that of the remaining macroblocks.

In the example of FIG. 9, the left image L is entered unchanged into the container frame C" at the upper left corner, in a manner such that all its edges coincide with the edges of the macroblocks of the container frame C". This is obtained by copying the 1280×720 pixels of the image L into an area C1" consisting of the first 1280 pixels of the first 720 rows of the container frame C".

Subsequently, the image 801 decomposed by the module 104 is entered into the container frame C". This is achieved by the module 105 by copying the pixels of the decomposed image into the container frame C" in areas thereof which are not occupied by the image L, i.e. external to the area C1".

The four sub-images corresponding to the regions R1", R2", R3" and R4", into which the right image 801 has been decomposed, are entered into the container frame C" in a manner such that they do not overlap and that their edges coincide with the edges of the macroblocks of the container frame C".

In this example as well, the regions R1", R2", R3" and R4" are copied into respective areas of the frame C" without any alteration; therefore, the copied regions coincide with the component regions.

An example of the container frame C" outputted by the module 105 is shown schematically in FIG. 10.

The region R1" is copied into the last 640 pixels of the first 720 rows (area C2"), i.e. next to the previously copied image L.

The regions R2", R3" are copied under the area C1", respectively into the areas C3" and C4", comprising the first 640 pixels of the rows from 721 to 960 and the next 640 pixels of the rows from 721 to 960, respectively. The region R4" is copied into the area C5" under the area C2", corresponding to the last 640 pixels of the rows from 721 to 960. The last 120 rows are therefore empty.

As shown in FIG. 4, the container frame C" generated by the packer 100 is processed into a compressed stereoscopic video stream through the compression module 106.

Before applying the compression algorithms, the compression module 106 adds 8 rows of 1920 pixels at the bottom of the container frame C", thus obtaining a modified container frame that can be decomposed into a regular grid of macroblocks.

The decomposition of the image 801 into four regions and the subsequent arrangement of the latter inside the frame C" cause the last row of macroblocks at the bottom of the modified container frame to contain no useful information. Therefore, the discontinuity potentially generated by the eight rows added by the compression module 106 produces no artifacts on the recomposed image.

As an alternative to the solution shown in FIG. 10, the regions R2", R3" and R4" may be copied into the container frame C" in areas disjoined from the regions L and R1", i.e. neither overlapping nor bordering on said regions.

In particular, the regions R2", R3" and R4" may be aligned with and disjoined from both the regions L and R1" and the bottom edge of the container frame C". Alternatively, the regions R2", R3" and R4" may be arranged at different heights, in positions not aligned with each other.

Although effective and advantageous in certain situations, the above-described multiplexing method has the drawback that it divides the image R into four rectangular regions, i.e. one more than the minimum number required, taking into account the dimensions of the container frame and of the images R and L.

Figure 11:
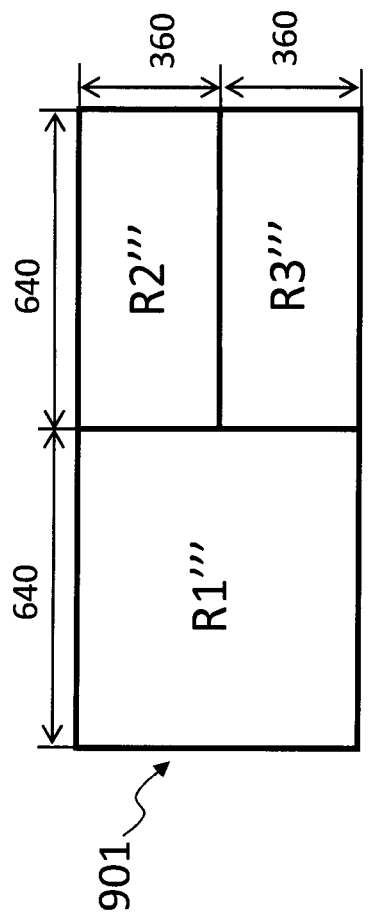
FIG. 11 shows a third form of decomposition of an image to be entered into a composite image.

A further example of embodiment of a multiplexing method according to the present invention will now be described with reference to FIGS. 11 and 12.

An image 901 taken from the sequence 103 of a 720p video stream is decomposed into three rectangular regions R1''', R2''', R3'''. In particular, the image 901 is decomposed by dividing it into two equally sized portions and then by dividing again one of these two portions into two identical portions.

The region R1''' has a size of 640×720 pixels and is obtained by taking all the first 640 pixels of each row.

The region R2''' has a size of 640×360 pixels and is obtained by taking the pixels from 641 to 1280 of the first 360 rows.

The region R3''' has a size of 640×360 pixels and is obtained by taking the pixels from 641 to 1280 of the rows from 361 to 720.

As in the above-described examples, the step of decomposing the right image is carried out by the module 104, which, in this specific case, outputs three sub-images corresponding to the three regions R1''', R2''', R3'''.

A composite image C''', or container frame C''', is then constructed, which comprises the information of the two right and left images received.

In this example, the container frame C''' is a composite image of the type previously described with reference to the image 300 of FIG. 3, in particular having a size of 1920×1080 pixels.

The left image L is entered without any alteration into the container frame C''' at the upper left corner, as described with reference to the examples of FIGS. 7 and 10.

Subsequently, the image 901 decomposed by the module 104 is entered into the container frame C''' in the areas not occupied by the image L.

Figure 12:
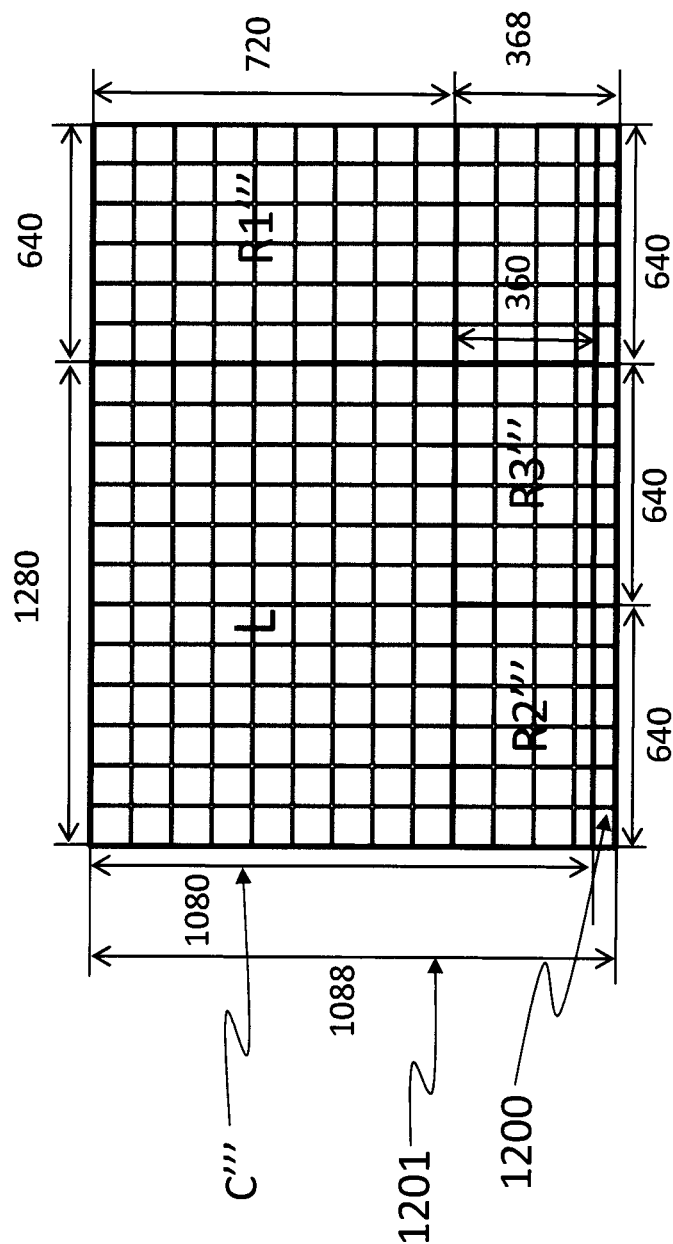
FIG. 12 shows a composite image into which the regions present in FIG. 11 have been entered.

An example of the container frame C''' outputted by the module 105 is shown in FIG. 12. The region R1''' is copied into the last 640 pixels of the first 720 rows, i.e. next to the previously copied image L.

The regions R2''' and R3''' are copied under the area occupied by the left frame L, in areas comprising, respectively, the first 640 pixels of the rows from 721 to 1080 and the next 640 pixels of the rows from 721 to 1080.

The container frame C''' is then transferred to the compression module 106, which adds eight rows 1200 of 1920 pixels at the bottom of the container frame itself, so as to obtain a modified frame 1201 having a size of 1920×1088 pixels which is perfectly divisible into an integer number of non-overlapping 16×16 macroblocks.

In order to avoid any distortion during the decompression step, a buffer region Rc2 is entered under the region R2''', i.e. into the first 640 pixels of the last eight rows (the added ones) of the modified frame 1201.

In a particular example of embodiment shown in FIGS. 13a, 13b and 13c, the buffer region Rc2 is a copy of the first eight rows of the region R3'''. By means of this processing performed by the module 108, the region R2''' is thus transformed into a derived region R2'''der having a size of 640×368 pixels. The region R2'''der comprises the region R2''' and the buffer region Rc2, and is such that it is completely divisible by an integer number of macroblocks; also, it is positioned with its edges coinciding with the edges of the macroblocks of the grid of the frame 1201.

The region R3''' is also processed by adding thereto an 8-row buffer region Rc3 in order to obtain a derived region R3'''der divisible by an integer number of macroblocks.

In one embodiment, the buffer region Rc3 has arbitrary pixel values, e.g. all of them correspond to the same green colour, because the resulting discontinuity produces compression artifacts which are located at the edge of the rebuilt right image, and which are therefore not much perceived by the user.

Finally, the stereoscopic video stream comprising the modified container frames 1201 is compressed through the compression module 106.

It is apparent that the invention is not limited to the above-described exemplary embodiments, and that the man skilled in the art may make many changes to the above-described method; for example, FIGS. 14*a* and 14*b* show a different possible buffer region Rc2.

As in the example of FIGS. 13*a*-13*c*, the component regions are those previously described with reference to FIG. 11. In this case as well, the derived region R2'''der comprises the component region R2''' and the buffer region Rc2, so that it has a size of 640×368 pixels. The buffer region Rc2 is added at the bottom edge of the region R2''', and contains pixels corresponding to the rows from 352 to 359 of the region R2''', arranged in the reverse order, i.e. the row 359 corresponds to the first row of the buffer region Rc2, the row 358 corresponds to the second row of the buffer region Rc2, and so forth.

Another way of obtaining a derived region R2'''der will now be described with reference to FIGS. 15*a* and 15*b*. In this case as well, the component regions are those previously described with reference to FIG. 11. The region R2''' is first inverted with respect to its bottom edge to obtain a region R2'''inv, at the bottom edge of which a buffer region Rc2 with eight rows of 640 pixels is then added. The values of the pixels of the buffer region Rc2 are arbitrary; for example, they may all correspond to the same green colour. In this manner, a region R2'''der having a size of 640×368 pixels is obtained, which is entered into the first 640 pixels of the last 368 rows of the modified container frame 1201. The discontinuity present in the last lower macroblocks of R2''' produces compression artifacts which, due to the inversion carried out, appear at the upper right edge of the rebuilt image R, and are therefore scarcely perceived by the viewer.

In this example of FIGS. 15*a*-15*b*, the processing carried out to obtain the derived region R2'''der from the component region R2''' includes not only the addition of the buffer region, but also the preliminary up-down inversion of R2'''.

To summarize the teachings set out above in regard to the processing of the component images, it can be stated that, in order to switch from a component region to a derived region, the processing may consist of rotations, up-down or right-left inversions of the component region and/or addition of a buffer region containing arbitrary pixels or taken from another component region. This processing is aimed at reducing the artifacts introduced by the subsequent compression process or at moving them to the edges of the rebuilt image Rout.

In a further embodiment, the space left available in the composite image can be used for entering any form of signalling which may be necessary to rebuild the right and left images at demultiplexer level, e.g. concerning the way in which the composite image has been formed, or for entering metadata of whatever nature, such as a depth map, for supplying instructions to the decoder as to the proper positioning of graphic items generated by the latter (e.g. subtitles).

In this embodiment, a region of the container frame not occupied by the right or left images or by parts thereof is used for receiving the signal. In the case of binary signalling, the pixels of this signalling region are, for example, coloured in two colours characterized by values being very distant from each other (e.g. black and white), so as to create a bar code of any kind, e.g. linear or two-dimensional, which carries the signalling information. Preferably, the image to be entered into the frame is decomposed by taking into account the need for breaking up the image (e.g. R in the above example) into the smallest number of rectangular regions.

Figure 16:
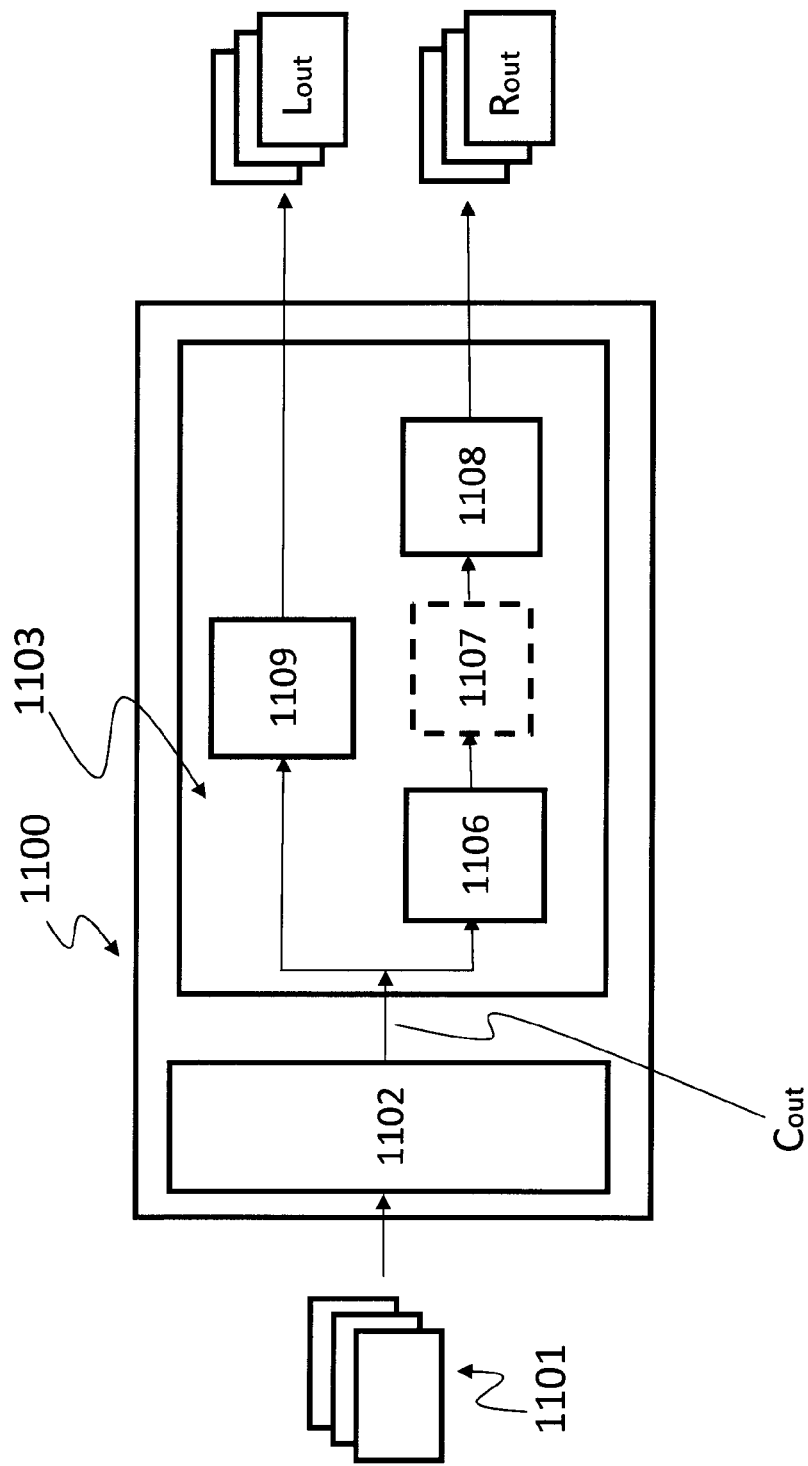
FIG. 16 shows a block diagram of a receiver for receiving a composite image generated according to the method of the present invention.

FIG. 16 shows a block diagram of a receiver 1100 which decompresses the received stereoscopic video stream and rebuilds the two right Rout and left Lout images, thus making them available to a display device (e.g. a television set, a monitor or a projector) that allows fruition of 3D contents. The receiver 1100 may be a set-top-box or a receiver built in a television set.

Similar considerations as those made below for the receiver 1100 will also apply to a reader (e.g. a DVD reader) that reads a compressed stereoscopic video stream and processes it in order to extract the right and left images multiplexed into the container frame.

Referring back to FIG. 16, the receiver receives (via cable or antenna) a compressed stereoscopic video stream 1101 and decompresses it by means of a decompression module 1102, thereby obtaining a video stream comprising a sequence of container frames Cout corresponding to the frames C. If there is an ideal channel or if container frames are being read without errors from a mass memory or a data medium (Bluray, CD, DVD), the frames Cout correspond to the container frames C carrying the information about the two right and left images, except for any artifacts introduced by the compression process.

Figure 17:
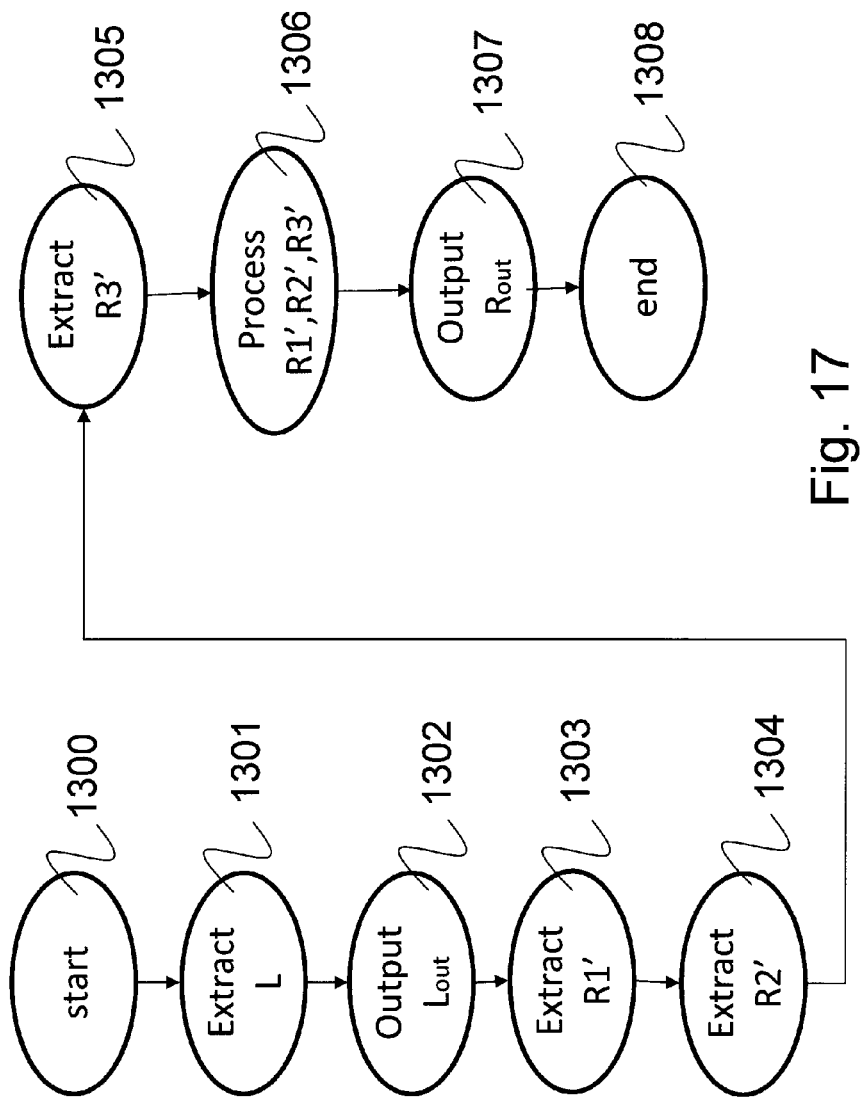
FIG. 17 is a flow chart of a method for rebuilding the right and left images multiplexed into a composite image according to the method shown in the diagram of FIG. 4.

These frames Cout are then supplied to a reconstruction module 1103, which executes an image reconstruction method as described below with reference to FIGS. 16 and 17.

The reconstruction module 1103 comprises an extractor module 1106 for the decomposed image, a processing module 1107, a reassembler module 1108 and an extractor module 1109 for the non-decomposed image.

The reconstruction process starts at step 1300, when the decompressed container frame Cout is received. In this example, the container frame is the one previously described with reference to FIG. 7.

The extractor module 1109 extracts (step 1301) the left image L by copying the first 1280×720 pixels (area C1') of the decompressed frame into a new frame which is smaller than the container frame, e.g. a frame of a 720p stream. The left image L thus rebuilt Lout is outputted to the receiver 1100 (step 1302).

Subsequently, the extractor module 1106 extracts the right image R from the container frame Cout.

The step of extracting the right image begins by extracting (step 1303) the area C2' present in the frame Cout (which contains R1'). More in detail, the extractor module 1106 extracts the pixels of the columns from 1281 to 1920 and of the first 720 rows of the container frame and then transfers them to the reassembler module 1108. The latter enters the extracted pixels into the corresponding first 640×720 pixels of a new frame that represents the rebuilt image Rout.

The area C3' is then extracted (step 1304): the pixels of the area C3' (corresponding to the source region R2') are selected from the decompressed frame Cout. More in detail, the pixels of the columns from 1 to 640 and of the last 368 rows of the container frame Cout are copied into the columns from 641 to 1280 of the first 368 rows of the image Rout.

As far as R3' is concerned (step 1305), the pixels of the area C4' are selected. More in detail, the pixels of the columns from 641 to 1280 of the last 352 rows of the container frame Cout are copied into the columns from 641 to 1280 of the last 352 rows of the image Rout.

At this point, the right image Rout has been fully rebuilt and can be outputted (step 1307) by the reassembler module.

The process for rebuilding the right and left images contained in the container frame Cout is thus completed (step 1308).

Said process is repeated for each frame of the video stream received by the receiver 1100, so that the output will consist of two video streams 1104 and 1105 for the right image and for the left image, respectively.

In this embodiment, the regions R1, R2 and R3 are extracted from the container frame and entered into the frame Rout through simple pixel copy operations.

More in general, the regions extracted from the container frame are the derived regions, which must therefore undergo further processing steps to generate the corresponding component regions, which are then entered into the frame Rout.

These processing steps are of course the reverse of those carried out on the generation side to obtain the derived regions from the component regions, and may therefore include rotations, inversions and removal of pixels, such as the buffer pixels.

The processing steps are carried out by the processing module 1107, which is interposed between the extractor module 1106 and the reassembler module 1108.

In the example just described with reference to FIGS. 7 and 16, the extracted regions coincide with the component regions, and therefore the processing module 1107 simply transfers to the module 1108 the pixels extracted by the module 1106. The block diagram of FIG. 17 also refers to this case.

Conversely, should the regions extracted at steps 1302, 1303, 1304 be derived regions not coinciding with the component regions, step 1306 would include the operations required for obtaining the component regions from the derived regions. In such a case as well, however, the rebuilt image Rout would be outputted at step 1307.

The process for rebuilding the right and left images described above is based upon the assumption that the demultiplexer 1100 knows how the container frame C was built and can thus extract the right and left images.

Of course, this is only possible if the multiplexing method is standardized.

In order to take into account the fact that the container frame may be generated in any one of the above-described methods, or anyway according to any one of the methods that utilize the solution which is the subject of the appended claims, the demultiplexer may use the signalling information contained in a predefined region of the composite image (e.g. a bar code, as previously described) in order to know how the contents of the composite image must be unpacked and how to rebuild the right and left images.

After decoding the signalling, the demultiplexer will know the position of the unchanged image (e.g. the left image in the above-described examples), as well as the positions and any transformations (rotation, inversion or the like) of the regions into which the other image was decomposed (e.g. the right image in the above-described examples).

With this information the demultiplexer can extract the unchanged image (e.g. the left image) and rebuild the decomposed image (e.g. the right image).

It is clear that the information required for extracting the unchanged image and for extracting and rebuilding the decomposed image may also be transmitted in the form of metadata not contained in the composite frame, but in other parts of the compressed video stream. This information may also be automatically deduced in the decoder if the packing format is known, so that it may be sufficient to just transmit an identifier of the packing format.

Although the present invention has been illustrated so far with reference to some preferred and advantageous embodiments, it is clear that it is not limited to said embodiments and that many changes may be made thereto by a man skilled in the art wanting to combine into a composite image two images relating to two different perspectives (right and left) of an object or a scene.

For example, the electronic modules that implement the above-described devices, in particular the device 100 and the receiver 1100, may be variously subdivided and distributed; furthermore, they may be provided in the form of hardware modules or as software algorithms implemented by a processor, in particular a video processor equipped with suitable memory areas for temporarily storing the input frames received. These modules may therefore execute in parallel or in series one or more of the video processing steps of the image multiplexing and demultiplexing methods according to the present invention.

It is also apparent that, although the preferred embodiments refer to multiplexing two 720p video streams into one 1080p video stream, other formats may be used as well.

Finally, it is also apparent that the invention relates to any demultiplexing method which allows a right image and a left image to be extracted from a composite image by reversing one of the above-described multiplexing processes falling within the protection scope of the present invention.

The invention claimed is:

1. A method for generating a composite image of a stereoscopic video stream comprising a pair of a right image (R) and a left image (L) of a scene, said right image (R) and left image (L) being such that, when viewed by a spectator's right eye and left eye, respectively, they cause the spectator to perceive the scene as being three-dimensional, said method comprising the steps of:
   generating a composite image (C) comprising all the pixels of the pair of right (R) and left (L) images,
   defining a grid of macroblocks of the composite image (C), each macroblock of said grid comprising a plurality of adjacent pixels,
   decomposing one image of said pair of right image and left image into a plurality of component regions (Ri) comprising a plurality of contiguous pixels,
   processing said component regions (Ri) in a manner such as to generate corresponding derived regions (Rider), said derived regions (Rider) comprising at least all the pixels of a corresponding component region and being such that they can be decomposed into an integer number of macroblocks,
   arranging the non-decomposed image of said pair and said plurality of derived regions (Rider) in said composite image (C) in a manner such that all the edges of the non-decomposed image and of the derived regions coincide with edges of macroblocks of said grid.

2. A method according to claim 1, wherein said component regions and said non-decomposed image can be decomposed into an integer number of macroblocks of said grid.

3. A method according to claim 1, wherein at least one of said derived regions is identical to one of said component regions.

4. A method according to claim 1, wherein at least one of said derived regions is obtained by rotating and/or inverting a corresponding component region.

5. A method according to claim 1, wherein the edges of at least one of the derived regions coinciding with edges of the composite image correspond to edges of the decomposed image.

6. A method according to claim 1, wherein at least one derived region of said plurality of derived regions is obtained by adding a plurality of pixels to a corresponding component region, said plurality of pixels being a portion of a different component region bordering on said corresponding component region.

7. A method according to claim 1, wherein a portion of a component region is selected, the selected portion is inverted, and the inverted portion is added to one edge of said component region.

8. A method according to claim 1, wherein said decomposed image is decomposed into the minimum number of rectangular component regions by taking into account the space available in said composite image and the space occupied by said non-decomposed image.

9. A method according to claim 1, wherein at least one portion of the space left available in the composite image is used for entering a signal necessary for rebuilding the right and left images at demultiplexer level.

10. A method according to claim 1, comprising the step of compressing said composite image by means of a compression process that decomposes said composite image into macroblocks as defined in said macroblock grid.

11. A method according to claim 1, wherein said derived regions have a rectangular shape.

12. A method according to claim 1, wherein said macroblocks have a square shape, in particular a size of 16×16 pixels.

13. A stereoscopic video stream comprising at least one composite image (C) generated by means of the method according to claim 1.

14. A method for rebuilding a pair of images (Lout, Rout) starting from a composite image (C) which has undergone a compression and decompression process based on the definition of a macroblock grid, comprising the steps of:
generating a first image (Lout) of said pair of images by copying a single group of contiguous pixels of the decompressed composite image;
extracting a plurality of derived regions (Rider) of said decompressed composite image, each derived region of said plurality of derived regions having edges corresponding to edges of macroblocks of said grid and comprising a plurality of pixels not included in said single group of pixels;
processing said plurality of derived regions (Rider) in a manner such as to generate corresponding component regions (Ri), wherein all the pixels of a component region correspond to pixels of a derived region;
generating a second image (Rout) of said pair of images by joining said component regions.

15. A method according to claim 14, wherein at least one of said component regions is obtained by rotating and/or inverting a corresponding derived region.

16. A method according to claim 14, wherein said second image is generated by processing said derived regions in a manner such that the edges of at least one of the derived regions coinciding with edges of the composite image correspond to edges of said second image.

17. A method according to claim 14, wherein at least one component region is obtained from a corresponding derived region by removing a portion adjacent to the edge of a corresponding derived region.

18. A method according to claim 14, wherein said derived regions and said single group of pixels are extracted on the basis of a piece of information placed in an area of said decompressed composite image.

19. A system for generating a composite image of a stereoscopic video stream comprising a pair of a right image (R) and a left image (L) of a scene, said right image (R) and left image (L) being such that, when viewed by a spectator's right eye and left eye, respectively, they cause the spectator to perceive the scene as being three-dimensional, said system comprising:
a processor;
a decomposer module for decomposing one image of said pair of a right image and a left image into a plurality of component regions (Ri) comprising a plurality of contiguous pixels;
a processing module for processing said component regions in a manner such as to generate a plurality of corresponding derived regions (Rider); and
a composite image generator module, wherein said generator module is adapted to define a grid of macroblocks of the composite image and to arrange the non-decomposed image of said pair and said plurality of derived regions in a composite image in a manner such that all the edges of the non-decomposed image and of the derived regions coincide with edges of macroblocks of said grid,
wherein at least one of the decomposer module, the processing module, and the composite image generator module operate with the processor.

20. A system according to claim 19, comprising a compression unit operationally connected to said generator module to compress said composite image (C).

21. The system according to claim 19, the system further comprising a packer device, the packer device including the processor, the decomposer module, the processing module, and the composite image generator module.

22. The system according to claim 19, wherein the decomposer module includes the processor, the processing module includes a second processor, and the composite image generator module includes a third processor.

23. A system for rebuilding a pair of a right image(Rout) and a left image (Lout) starting from a composite image which has undergone a compression and decompression process based on the definition of a macroblock grid, comprising:
a processor;
a first extractor module for generating a first image of said pair of right (Rout) and left (Lout) images by copying a single group of contiguous pixels from a region of the decompressed composite image;
a second extractor module operationally connected to the output of said decompression module and adapted to extract a plurality of derived regions (Rider) of the decompressed composite image, each derived region of said plurality of derived regions having edges corresponding to edges of macroblocks of said grid and comprising a plurality of contiguous pixels not included in said single group of pixels;
a processing module operationally connected to said second extractor module for processing said derived regions in a manner such as to generate corresponding component regions (Ri) in which all the pixels of a component region correspond to pixels of a derived region; and
a reassembler module operationally connected to said processing module and adapted to join together said component regions in order to reassemble a second image of said pair of right (Rout) and left (Lout) images,
wherein at least one of the first extractor module, the second extractor module, the processing module, and the reassemble module operate with the processor.

24. A system according to claim 23, comprising a decompression module for decompressing a compressed composite image and outputting said composite image.

25. A set-top-box comprising the system according to claim 23.

26. A television set comprising the system according to claim 23.

27. The system according to claim 23, the system further comprising a receiver, the receiver including the processor, the first extractor module, the second extractor module, the processing module, and the reassembler module.

28. The system according to claim 23, wherein the first extractor module includes a first processor, the second extractor module includes a second processor, the processing module includes a third, and the reassemble module includes a fourth processor.

* * * * *